Jan. 29, 1957  J. NEWMAN  2,779,716
METHOD AND APPARATUS FOR CONTACTING
FLUIDS WITH SOLIDS
Filed Nov. 28, 1952
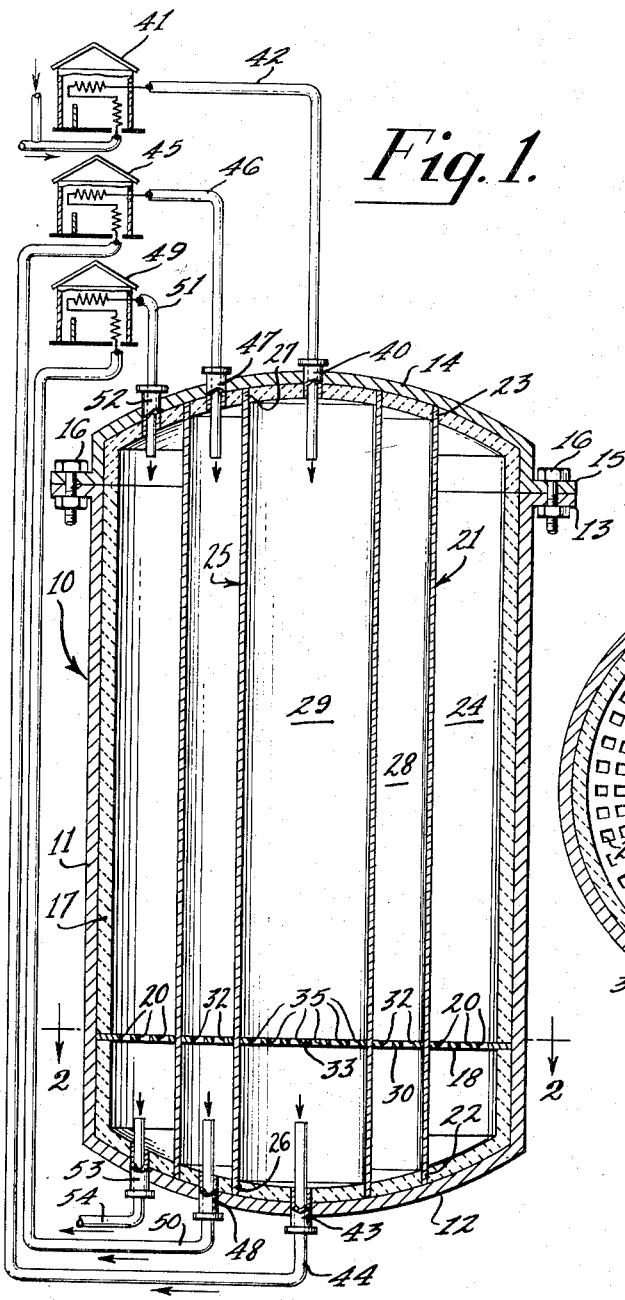
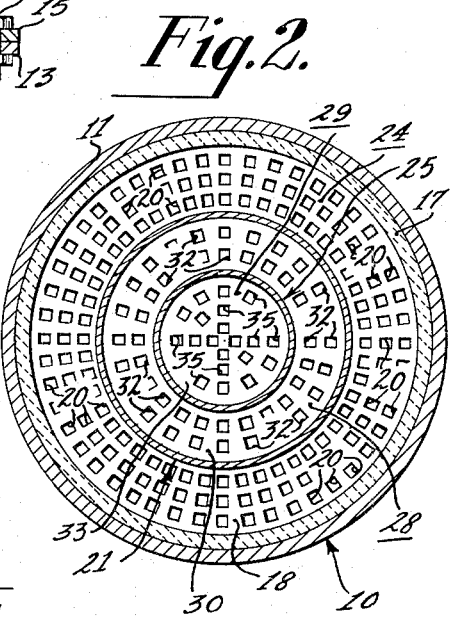
INVENTOR.
Julian Newman
BY
William A. Alexander
ATTORNEY.

United States Patent Office 2,779,716
Patented Jan. 29, 1957

2,779,716

METHOD AND APPARATUS FOR CONTACTING FLUIDS WITH SOLIDS

Julian Newman, Lansdowne, Pa., assignor to Houdry Process Corporation, Wilmington, Del., a corporation of Delaware Application November 28, 1952, Serial No. 322,996

11 Claims. (Cl. 196—52)

The present invention relates generally to apparatus for contacting fluids with solids and is more particularly directed to hydrocarbon conversion reactors and hydrocarbon conversion methods employing such reactors. The invention is especially concerned with methods for hydrogenative conversion of hydrocarbons and embraces certain novel features in the construction of reactors for carrying out such processes.

These conversion or reforming processes have heretofore required a plurality of reactor vessels, generally three or more, connected in series and each containing a fixed bed of catalyst. The catalysts usually employed comprise metal oxides of group VI B or noble metals of group VIII on various types of supports. Among the catalysts proposed or used in such processes are those comprising 5 to 15% chromium or molybdenum oxide on "activated alumina," and certain supported noble metal catalysts, including those prepared by impregnation of alumina with $H_2PtCl_6$ (in an amount furnishing up to 1% platinum by weight of catalyst) followed by reduction or other decomposition of the platinum salt. In the reactor line, preceding each vessel, a furnace or heater is provided for heating the charge and intermediate reaction products to the required temperatures. The charge includes the hydrocarbon to be reformed and hydrogen or hydrogen-rich recycled gas in the required proportion and at the required pressure. After the charge is initially heated, it is passed through the first reactor vessel of the series, contacting the catalyst therein, and the total effluent from that reactor is reheated to the proper temperature and passed through the next reactor of the series, and so on. The hydrocarbon products effluent from the last reactor vessel may be separated or treated as desired.

While in hydrogenative reforming operations employing Pt catalyst, continuous operation over long on stream periods are possible, without intermediate regeneration; in such processes, as well as in those processes employing other types of catalyst requiring more frequent regeneration, the system and arrangement of the present invention permits regeneration to be carried out, if desired, in the usual manner.

In accordance with the present invention, a single reactor vessel is provided which includes a plurality of reactor chambers. As the temperatures and pressure in the various reactor chambers are substantially the same, the chambers may have common uninsulated walls of nominal thicknesses. Thus, heat will be transferred between the reactor chambers to approach substantially isothermal operation and reduce interstage heating requirements. For these reasons, the present invention will reduce the apparatus space requirements as well as the cost of construction and operation.

Other advantages of the present invention will become apparent upon reading the following specification and referring to the accompanying drawings illustrating a practical embodiment of the invention.

In the drawings:

Figure 1 is a sectional elevational view of a reactor constructed in accordance with the present invention.

Fig. 2 is a sectional view taken on the line 2—2 of Fig. 1.

Referring now more particularly to the drawings, 10 designtaes generally a vertically disposed cylindrical pressure vessel having an intermediate body portion 11 and a rounded lower end 12 integral with the body portion. Adjacent its upper end, the body portion 11 is formed with a laterally extending circumferential flange 13. The vessel 10 is provided with a rounded upper end closure 14 having a laterally extending circumferential flange 15. The upper end closure 14 may be detachably secured in position by means of bolts 16 extending through the flanges 13 and 15.

The vessel 10 is lined with any suitable insulating material 17 and is provided above the bottom 12 with a horizontally disposed support or plate 18 of annular shape, extending around the inside of vessel 10. In order to support a bed of catalyst and permit the charge to pass through, the plate 18 is formed with a plurality of perforations 20 and is fixedly secured to the vessel 10, as by welding or other suitable means.

Arranged longitudinally of and within the vessel 10 is a cylindrical wall 21 having its lower end 22 adjacent the lower end 12 of vessel 10, and having its upper end 23 adjacent the upper end 14 of the vessel. It is seen that the cylindrical wall 21 combines with the vessel 10 to form an annular chamber 24. The wall 21 is preferably fabricated of metal or other suitable heat conducting material for a purpose to be described hereinafter.

Disposed concentrically of and within the wall 21 is a second cylindrical wall 25 having its lower end 26 adjacent the lower end 12 of vessel 10 and having its upper end 27 adjacent the upper end 14 of the vessel. Thus, the walls 21 and 25, and the vessel 10 combine to form an annular chamber 28 and a cylindrical chamber 29. The wall 25 is also preferably fabricated of metal or other suitable heat conducting material.

An annular plate 30 is disposed within the chamber 28 and fixedly secured therein as by welding or other suitable means. The plate 30, similarly to the plate 18 is spaced from the bottom of the vessel 10 and provided with perforations 32 to thereby support a catalyst bed (not shown) and permit the charge to pass through. In like manner, and for the same purpose, the chamber 29 is provided with a circular plate 33 formed with a plurality of perforations 35. The plates 18, 30 and 33, as shown, may extend across the vessel 10 at a common level.

The central chamber 29 is provided at its upper end with an inlet 40 communicating with the heater 41 through the conduit or line 42. At its lower end, the chamber 29 is provided with an outlet 43 which communicates through conduit or line 44 with the heater 45. The heater 45, in turn, communicates with the chamber 28 through conduit or line 46 and inlet 47. The chamber 28, in like manner to chamber 29, is provided with an outlet 48 which communicates with the heater 49 through the line or conduit 50. Similarly, the heater 49 communicates with the chamber 24 through the line or conduit 51 and the inlet 52. Lastly, the chamber 24 is provided with an outlet 53 and a discharge line or conduit 54.

In operation, with the upper end 14 of vessel 10 removed, the catalyst bed may be deposited in known manner on a graduated layer of ceramic balls disposed on plates 18, 30 and 33. The upper end 14 may then be replaced and secured in position by bolts 16. A charge of hydrocarbon to be reformed and hydrogen or hydrogen-rich recycled gas in the proper proportions and at approximately 600 p. s. i. g. pressure is then passed through heater 41, line 42, and into reactor chamber 29. The charge is there contacted with the catalyst bed maintained on the plate 33 and the reaction products discharged at about 595 p. s. i. g. pressure to the heater 45. The mixture is there heated to the required temperature and then supplied to the chamber 28. Here again, the charge is contacted with a catalyst bed and withdrawn through line 50 for heating by furnace or heater 49. In the same manner as for chambers 29 and 28, the charge is supplied, at the proper temperature, to chamber 24 from the heater 49. The charge is again contacted with a catalyst bed and discharged through conduit 54 for separation or further treatment, as desired.

In as much as the temperature drop during progress of the complete hydocarbon conversion varies from chamber to chamber in the series, the relative amounts of catalyst in each of the chambers are determined with reference to the heat balance during progress of the reaction. Further, it is preferred that the relative volumes of the reactor chambers be fixed with reference to the relative amounts of catalyst to be disposed within the chambers. A satisfactory distribution of catalyst has been found to be from 15 to 25% in chamber 29, 30 to 40% in chamber 28 and 40 to 50% in chamber 24. The preferred proportions are 20%, 33% and 47% in chambers 29, 28 and 24 respectively.

As the above described operation is continuous, and as there is thermal communication between the chambers 24, 28 and 29, heat will be transferred between the chambers approaching a substantially isothermal process, which may permit higher space rates to be used than with the usual adiabatic operations.

It will be understood that the invention is not limited to the treatment of any particular materials, the particular reforming process hereinbefore described being used for purposes of illustration and clarity of understanding. It will be further understood that although the preferred form of pressure vessel 10 and chamber walls 21 and is cylindrical, other shapes are within the scope of this invention.

Obviously many modifications and variations of the invention as hereinbefore set forth may be made without departing from the spirit and scope thereof, and therefore only such limitations should be imposed as are indicated in the appended claims.

What is claimed is:

1. In an apparatus for hydrogenative reforming of hydrocarbons, the combination of: an upright vessel closed at each end, at least one circumferentially-complete imperforate heat-conductive wall member disposed concentrically within said vessel and extending the length thereof, thereby forming about the axis of said vessel a central chamber surrounded by one or more annular chambers; a horizontal perforate member within and spaced from the bottom of each of said chambers for supporting a bed of catalyst; each of said chambers having an inlet for gaseous material at its upper end and an outlet for gaseous material at its lower end communicating with the space beneath said perforate bed-supporting member; and conduit means exteriorly of said vessel and associated with said inlets and said outlets to connect said chambers in series and to provide unidirectional flow paths through said chambers from the upper to the lower end of said vessel.

2. Apparatus as defined in claim 1 in which the walls of said vessel comprise a layer of insulating material and said wall members within said vessel are heat conductive.

3. Apparatus as defined in claim 1 including heating means connected to said conduit means whereby said gaseous material is heated prior to its introduction into each of said chambers.

4. A plural stage reactor comprising an upright cylindrical pressure vessel having a lining of insulation covering its side and end walls; a plurality of imperforate cylindrical heat-conductive members concentrically arranged within said pressure vessel and extending the length thereof so as to provide a central cylindrical chamber and a plurality of annular chambers; horizontal perforate plate members disposed at a common level within the lower region of said chambers each adapted to support a compact bed of granular catalyst therein; a gas inlet at the upper end and a gas outlet at the lower end of each of said chambers adapted to provide unidirectional flow therethrough; external conduits connecting said chambers in series, whereby gaseous reactants are introduced to said vessel at the upper end of said central cylindrical chamber and the final reaction product is removed from said vessel at the lower end of the outermost annular chamber; and individual heaters connected to said conduits to preheat the stream of gaseous material initially introduced into said vessel and to reheat gaseous material passing from chamber to chamber.

5. Apparatus as defined in claim 4 in which said chambers are of progressively increasing volume outwardly from said central cylindrical chamber.

6. Apparatus as defined in claim 5 in which the relative size and position of said cylindrical members within said vessel are such as to provide a catalyst volume in accordance with the heat balance during progress of the reaction, whereby heat is transferred between adjacent chambers to approach substantially isothermal operation and to reduce the interstage heating requirements of said heaters.

7. Apparatus as defined in claim 6 in which said cylindrical heat-conductive members are two in number, thereby forming three chambers within said vessel; and in which said central cylindrical chamber is arranged to provide 15-25%, the middle annular chamber 30-40%, and the outer annular chamber 40-50% of the total catalyst capacity.

8. In a hydrocarbon conversion process wherein gaseous hydrocarbons are converted stagewise in the presence of granular catalyst under conditions of relatively high temperature and pressure, the improvement which comprises the steps of: passing said hydrocarbons serially and in a single longitudinal direction through a plurality of separate reaction zones comprising confined compact beds of said catalyst arranged as a series of adjacent concentric layers, adjacent reaction zones being separated and arranged in indirect heat exchange relationship through a common heat-conductive medium; and separately reheating said hydrocarbons between said stages and exteriorly of said reaction zones, the thermal connection between said zones through said heat-conductive medium and the relative quantities of catalyst within said zones being such as to approach a substantially isothermal operation across said plurality of reaction zones, whereby the interstage reheating requirements are reduced to a minimum.

9. A method as defined in claim 8 in which said reaction zones are sized in accordance with the relative quantities of catalyst to be contained therein.

10. A method as defined in claim 9 in which said relative quantities of catalyst contained within said reaction zones are determined with reference to the potential temperature drops within the respective reaction zones.

11. A method as defined in claim 10 in which there are three of said reaction zones, the initial zone being adapted to provide 15-25%, the intermediate zone 30-40%, and the final zone 40-50% of the total catalyst capacity.

References Cited in the file of this patent

UNITED STATES PATENTS

| | | |
|---|---|---|
| 2,271,646 | Kassel | Feb. 3, 1942 |
| 2,349,812 | Day et al. | May 30, 1944 |
| 2,378,651 | Matuszak | June 19, 1945 |
| 2,472,254 | Johnson | June 7, 1949 |
| 2,517,525 | Cummings | Aug. 1, 1950 |